March 24, 1964  D. H. BEISEL ETAL  3,125,896
ACCELERATOR PEDAL
Filed Jan. 11, 1962

DONALD H. BEISEL
HENRY J. KOZICKI
INVENTORS

BY *John R. Faulkner*
*Thomas H. Oster*
ATTORNEYS

United States Patent Office 3,125,896
Patented Mar. 24, 1964

3,125,896
ACCELERATOR PEDAL
Donald H. Beisel, Royal Oak, and Henry J. Kozicki, Orchard Lake, Mich., assignors to Ford Motor Company, Dearborn, Mich., a corporation of Delaware
Filed Jan. 11, 1962, Ser. No. 165,541
5 Claims. (Cl. 74—513)

This invention relates to the construction of a pedal whereby improved operation of the pedal is attained. More particularly, the invention relates to a unitary pedal construction mounted to appear to hang from a conventional accelerator linkage. The invention belongs to the same general class of devices that is exemplified by U.S. Patent 2,167,869.

The invention comprises a pedal having a foot support portion and a suspension means continuous with the foot support portion. The suspension means extends from beneath a carpet and pad which cover an angled floor member and suspends the foot support portion above the angled floor member. The foot support portion of the pedal is suspended to hide the suspension means and is adapted to actuate an accelerator linkage.

The suspending of the foot support portion above the angled floor member, as described above, has the advantages of a neat appearance, extra comfort for persons wearing high heels and the prevention of foreign materials interfering with the pedal operation. The invention, hereinafter described in detail, also has the advantages of quiet operation and an accurate, positive pedal stop.

The general object of the invention is the provision of a unitary pedal construction.

Another object of the invention is the provision of a pedal construction having a suspended appearance.

Another object of the invention is the provision of a pedal capable of being easily actuated by a person wearing high heels.

Another object of the invention is the provision of a pedal construction whereby extraneous materials are prevented from interferring with the pedal operation.

Another object of the invention is the provision of a pedal construction whereby the pedal is quietly, positively and accurately stopped when in the extreme depressed position.

These objects and advantages will become more obvious when the detailed description is read in combination with the drawings, wherein.

Figure 1:
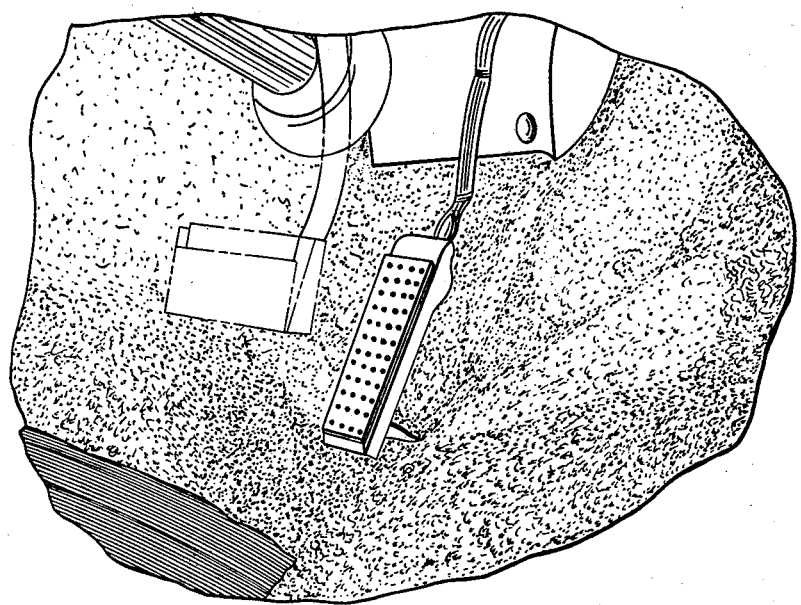
FIGURE 1 is a frontal perspective view of the pedal construction.
Figure 2:
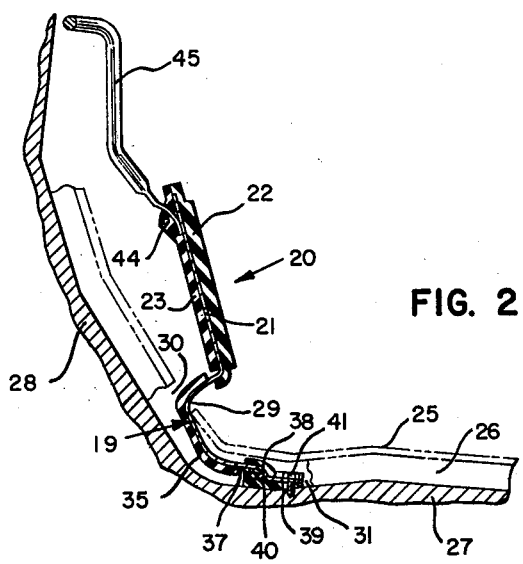
FIGURE 2 is a detailed cross section of the pedal construction.

In the preferred embodiment of the invention, shown in FIGURES 1 and 2, the improved pedal 20 comprises an elongated stamping or core 21, preferably made of metal. The stamping 21 has a treadle or more particularly a foot support portion 22. The foot support portion 22 is incased by a rubber coating 23. The rubber coating 23 provides a surface suitable to frictionally engage the foot of the driver.

A carpet 25 and pad 26 overlie a horizontal floor member 27 and an angled floor member or more particularly toe plate 28. The foot support portion 22 is suspended over the toe plate 28 by a suspension means such as support member 19 which is an integral part of the stamping 21.

The support member 19 has a first portion or more particularly a stop portion 29 which is continuous with the foot support portion 22 and protrudes through and above the carpet 25 and pad 26. An aperture 30 in the carpet 25 and a hollowed portion 31 in the pad 26 are provided to receive the stop portion 29. The stop portion 29 enters the carpet 25 and the pad 26 through the aperture 30 at a point overlying the toe plate 28.

The stop portion 29 has a center section 35 which will abut the toe plate 28 when the foot support portion 22 is in the extreme depressed position. The stop portion 29, including the center section 35, is coated on the underside with a soft material, preferably rubber. The rubber coating minimizes the noise caused by the center section 35 abutting the toe plate 28 in the extreme depressed position.

The support member 19 has a second portion such as pivoted support member 37 which is continuous with the stop portion 29. The pivoted support member 37 is disposed adjacent the horizontal floor member 27 and forms part of a hinge 38. The hinge 38 is formed from a plate 39 that meshes with the pivoted support member 37 to form a hinge in the usual way. The hinge 38 is pivoted on a shaft 40 and the hinge 38 and shaft 40 are incased in rubber and rigidly attached to the horizontal floor member 27 by a bolt 41 placed in the plate 39.

The foot support portion 22 has a shoulder 44 held rigidly in place on the underside by the rubber coating 23. The shoulder 44 cooperates with a control member such as accelerator link 45 which extends from above the foot support portion 22 and slidably engages the shoulder member 44. Depression of the foot support portion will, in turn, cause the accelerator link 45 to be actuated.

In operation, the sole of the foot of the operator is placed on the foot support portion 22 and the heel of the foot may be placed on the horizontal floor member 27, or in the case of a high heel such as is commonly worn by women, the heel may lie adjacent the protruding part of the stop portion 29 of the support member 19. The depression of the foot support portion 22 will cause the rubber-incased hinge 38 to flex and pivot about the shaft 40 until the central section 35 of the stop portion 29 abuts the toe plate 28. The abutting of the rubber incased central section 35 and the toe plate 28 will determine the extreme depressed position of the foot support portion 22, thus giving rise to quiet, positive and accurate pedal stop.

It should be noted that the stop portion 29 protrudes from a point located on the toe plate 28, thus the usual collection of foreign matter on the horizontal floor member 27 does not interfere with the operation of the pedal. The neat suspended appearance caused by the cooperation of the support member and the foot support portion is clearly shown in FIGURE 1.

It will be understood that the invention is not to be limited to the exact construction shown and described and that various changes and modifications may be made without departing from the spirit and scope of the invention, as defined in the appended claims.

We claim:
1. In an automobile having a horizontal floor member, a toe plate at an angle to the horizontal floor member and a carpet and pad disposed over said horizontal floor member and said toe plate, the combination comprising:
  (a) a depressable pedal having;
    (1) a support member that is attached to said horizontal floor member,
      (a) said support member having an elongated configuration,
      (b) a stop portion connected to said support member and located adjacent said toe plate and extending above said toe plate, said stop portion protruding through said carpet and pad disposed over said toe plate, and said stop portion extending beyond said carpet and pad covering said toe plate,
    (2) a foot support portion at an angle to said stop portion and operatively coupled to said stop portion, said foot support member being adapted to receive the foot of the operator of the automotive vehicle, and disposed above said toe plate to hide said stop portion of said support member protruding through said carpet and pad, and (b) a controllable member adapted to be actuated by said foot support portion and operatively coupled to said foot support portion.

2. In an automobile having a horizontal floor member, a toe plate at an angle to the horizontal floor member and a carpet and pad disposed over said horizontal floor member and said toe plate, the combination comprising:

(a) a depressable pedal having;
 (1) a support member that is pivotally attached to said horizontal floor member,
  (a) said support member having an elongated configuration,
  (b) a stop portion continuous with said support member and located adjacent to said toe plate and above said toe plate, and extending through said carpet and pad disposed over said toe plate, said stop portion protruding above said toe plate, and said stop portion abutting said toe plate when said pedal is in the extreme depressed position, and
 (2) a foot support portion at an angle to said stop portion and continuous with said stop portion, said foot support portion being adapted to receive the foot of the operator of the automotive vehicle, and disposed above said toe plate to hide said stop portion, and (b) a controllable member adapted to be actuated by said foot support portion and operatively coupled to said foot support portion.

3. In an automobile having a horizontal floor member, a toe plate at an angle to the horizontal floor member and a conforming protective carpet disposed over said horizontal floor member and said toe plate, the combination comprising:

(a) a pedal having;
 (1) a support member that is attached to said horizontal floor member, said support member having an elongated configuration,
  (a) a first portion between said protective carpet and said toe plate and disposed above said toe plate and extending through said protective carpet and protruding above said carpet covering said toe plate, and
  (b) a second portion between said protective carpet and said horizontal floor member and disposed above said horizontal floor member, said second portion being continuous with said first portion and attached to said horizontal floor member,
 (2) a treadle at an angle to said first portion and continuous with said first portion, said treadle being adapted to receive the foot of the operator of the automotive vehicle and incased in a relatively soft material, and (b) a controllable member extending from above said treadle and adapted to be actuated by said treadle, said controllable member operatively coupled to said treadle.

4. In an automobile having a horizontal floor member, a toe plate at an angle to said horizontal floor member and a carpet and pad covering said horizontal floor member and said toe plate, the combination comprising:

(a) a pedal having;
 (1) an elongated support member that is pivotally attached to said horizontal floor member, said support member having,
  (a) a first portion adjacent to said toe plate and above said toe plate, said first portion extending through said carpet and pad covering said toe plate and said first portion protruding above said carpet covering said toe plate, and
  (b) a second portion disposed adjacent to and above said horizontal member, said second portion being operatively coupled to said first portion and pivotally attached to said horizontal floor member,
 (2) a treadle at an angle to said first portion and operatively coupled to said first portion, said treadle being adapted to receive the foot of the operator of the automotive vehicle and incased in a resilient material, and (b) a controllable member adapted to be actuated by said treadle, said controllable member operatively coupled to said treadle.

5. In an automobile having a horizontal floor member, a toe plate at an angle to said horizontal floor member, and a carpet and pad covering said horizontal floor member and said toe plate, the combination comprising:

(a) a pedal having;
 (1) an elongated support member that is pivotally attached to said horizontal floor member, said support member having,
  (a) a first portion adjacent to said toe plate and above said toe plate, said first portion extending through said carpet and pad covering said toe plate and said first portion protruding above said carpet covering said toe plate, and
  (b) a second portion disposed adjacent to and above said horizontal member, said second portion forming a pivotal connection attached to said horizontal floor member,
 (2) a treadle at an angle to said first portion, said treadle being adapted to receive the foot of the operator of the automotive vehicle and incased in rubber, and
 (3) a shoulder member operatively coupled to said treadle, (b) a controllable member extending from above the support member and being adapted to be actuated by said shoulder, said controllable member operatively coupled to said shoulder member.

References Cited in the file of this patent

UNITED STATES PATENTS 2,167,868 Best _____ Aug. 1, 1939